US006838542B1

(12) United States Patent
Slack et al.

(10) Patent No.: US 6,838,542 B1
(45) Date of Patent: Jan. 4, 2005

(54) STABLE LIQUID BIURET MODIFIED AND BIURET ALLOPHANATE MODIFIED DIPHENYLMETHANE DIISOCYANATES, PREPOLYMERS THEREOF, AND PROCESSES FOR THEIR PREPARATION

(75) Inventors: William E. Slack, Moundsville, WV (US); Rick L. Adkins, Hurricane, WV (US); Hersel T. Kemp, New Martinsville, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 0 days.

(21) Appl. No.: 10/626,026

(22) Filed: Jul. 24, 2003

(51) Int. Cl.$^7$ ................................................ C08G 18/79
(52) U.S. Cl. ............... 528/67; 252/182.21; 252/182.22; 564/51
(58) Field of Search ................ 528/67; 252/182.21, 252/182.22; 564/51

(56) References Cited

U.S. PATENT DOCUMENTS

| | | | |
|---|---|---|---|
| 4,618,706 A | 10/1986 | Scholl et al. ............... | 560/335 |
| 4,677,136 A | 6/1987 | Rasshofer et al. .......... | 521/159 |
| 4,703,100 A | 10/1987 | Rasshofer et al. ............ | 528/66 |
| 4,837,359 A | 6/1989 | Woynar et al. ............. | 560/335 |
| 5,212,275 A | 5/1993 | Slack et al. ................... | 528/67 |
| 5,319,053 A | 6/1994 | Slack et al. ................... | 528/48 |
| 5,319,054 A | 6/1994 | Slack et al. ................... | 528/48 |
| 5,428,124 A | 6/1995 | Slack et al. ................... | 528/60 |
| 5,440,003 A | 8/1995 | Slack .......................... | 528/48 |
| 5,994,491 A | 11/1999 | Woynar et al. ............... | 528/68 |

*Primary Examiner*—Rachel Gorr
(74) *Attorney, Agent, or Firm*—Joseph C. Gil; N. Denise Brown

(57) ABSTRACT

This invention relates to stable liquid modified diphenylmethane diisocyanates which comprise a secondary amine based biuret modified diphenylmethane diisocyanate having an NCO group content of about 12 to about 30% by weight. The present invention also relates to stable liquid biuret allophanate modified MDIs, to stable liquid prepolymers of biuret modified MDIs, to stable liquid prepolymers of biuret allophanate modified MDIs, and to processes for the preparation of these compositions.

34 Claims, No Drawings

US 6,838,542 B1

STABLE LIQUID BIURET MODIFIED AND BIURET ALLOPHANATE MODIFIED DIPHENYLMETHANE DIISOCYANATES, PREPOLYMERS THEREOF, AND PROCESSES FOR THEIR PREPARATION

BACKGROUND OF THE INVENTION

This invention relates to stable liquid biuret modified diphenylmethane diisocyanates which comprise a secondary amine based biuret modified diphenylmethane diisocyanate having an NCO group content of about 12 to about 30% by weight. The present invention also relates to stable liquid biuret allophanate modified MDIs, to stable liquid prepolymers of biuret modified MDIs, to stable liquid prepolymers of biuret allophanate modified MDIs, and to processes for the preparation of these compositions.

Modified isocyanates, including modified diphenylmethane diisocyanates are known and described in the art. Various modifications include, for example, allophanate modified, biuret modified, carbodiimide modified, isocyanurate modified, uretdione modified, urethane modified, oxadiainetrione modified and various combinations thereof.

Biuret modified diisocyanates including those based on diphenylmethane diisocyanate and prepolymers thereof, are known and described in, for example, U.S. Pat. Nos. 4,618, 706, 4,677,136, 4,703,100, 4,837,359, 5,212,275, 5,428,124 and 5,994,491.

More specifically, U.S. Pat. Nos. 4,667,136 and 4,703,100 describe urea and/or biuret group containing polyisocyanates prepared by reacting an organic polyisocyanate and a high molecular weight (500 to 20,000) polyether or polyester containing at least two isocyanate-reactive groups which may be primary and/or secondary hydroxyl and/or amine groups and mixtures thereof, and optionally, a low molecular weight compound comprising one or more of aromatic diamines or triamines, (cyclo)aliphatic diamines of triamines, organic compounds containing at least one hydroxyl group and at least one amine group, organic compounds containing at least two alcoholic hydroxyl groups (and optionally an ether or ester group), and a hydrazine containing at least two reactive NH groups. Processes for the preparation of these urea and/or biuret modified isocyanates are also disclosed.

U.S. Pat. No. 4,837,359 discloses biurets prepared from a (cyclo)aliphatic diisocyanate and a (cyclo)aliphatic primary diamine compound. Biurets based on aromatic diisocyanates and diamines having aromatically attached amino groups and processes for their preparation are described by U.S. Pat. Nos. 4,618,706 and 5,994,491.

Urea and biuret prepolymers of diphenylmethane diisocyanates are known and described in U.S. Pat. Nos. 5,212, 275 and 5,428,124. U.S. Pat. No. 5,212,275 describes liquid prepolymers of ureas and/or biurets prepared by reacting a polyfunctional secondary amine group containing compound corresponding to a specific structure with a polyisocyanate of the diphenylmethane series. Storage stable, liquid prepolymers of MDI containing urea and/or biuret groups are disclosed in U.S. Pat. No. 5,428,124. These are prepared by reacting an aminocrotonate with a mixture of MDI having a specified isomer distribution.

Allophanate modified diphenylmethane diisocyanates, prepolymers thereof, etc are known and described in, for example, U.S. Pat. Nos. 5,310,053 and 5,310,054. The liquid stable products of U.S. Pat. No. 5,319,053 are characterized by an NCO group content of 12 to 32.5%, and comprise the reaction product of an aliphatic alcohol and a specified mixture of isomers of diphenylmethane diisocyanate. This reference also discloses stable liquid MDI prepolymers which comprise the reaction product of the allophanate-modified MDI as described above, with an organic material containing two or more active hydrogen groups. U.S. Pat. No. 5,319,054 describes liquid allophanate modified MDI compositions which are storage stable at 25° C. The diphenylmethane diisocyanate has a specific isomer distribution requiring 2 to 60% by weight of 2,4'-diphenylmethane diisocyanate.

Allophanate modified diphenylmethane diisocyanate prepolymers are described in U.S. Pat. No. 5,440,003. These products are stable liquids at 25° C., and comprise the reaction product of an isomeric mixture of diphenylmethane diisocyanate and an aromatic alcohol such as phenol, with the resultant product being converted to the allophanate having an NCO group content of 12 to 32% by weight.

Advantages of the present invention include stable liquid products having unique structures and higher functionalities than other biuret modified isocyanates, biuret-allophanate modified isocyanates and prepolymers thereof. An additional advantage of the present invention includes a lower dimer content in the product since the conversion is performed at a low temperature (i.e. 50 to 110° C.) requiring a relatively short reaction time. Higher functionalities are expected to lead to faster cure rates in foams.

SUMMARY OF THE INVENTION

This invention relates to stable, liquid biuret modified diphenylmethane diisocyanates comprising a secondary amine based biuret modified diphenylmethane diisocyanate having an NCO group content of about 12 to about 30%, and preferably 16 to 28% by wt., and to a process for the preparation of these biuret modified diphenymethane diisocyanates.

These stable, liquid biuret modified diphenylmethane diisocyanates comprise:
(a) a secondary monoamine group containing compound which may be aliphatic, aromatic or araliphatic; and
(b) diphenylmethane diisocyanate having an NCO group content of about 33.6% and comprising:
  (i) from 0 to 60% by weight of 2,4'-diphenylmethane diisocyanate,
  (ii) less than 6% by weight of 2,2'-diphenylmethane diisocyanate, and
  (iii) the balance being 4,4'-diphenylmethane diisocyanate, wherein the %'s by weight of (b)(i), (b)(ii) and (b)(iii) total 100% by weight of (b).

The process for the preparation of these stable liquid biuret modified diphenylmethane diisocyanates comprises:
(1) reacting
  (a) a secondary monoamine group containing compound which may be aliphatic, aromatic or araliphatic, and
  (b) diphenylmethane diisocyanate having an NCO group content of about 33.6% as described,
  in the presence of
  (c) at least one allophanate catalyst.

The present invention also relates to a stable liquid biuret allophanate modified diphenylmethane diisocyanates having an NCO group content of 12 to 30%, and preferably 16 to 28% by weight, and to a process for their preparation. The stable liquid biuret allophanate modified diphenylmethane diisocyanates comprise:
(a) a secondary monoamine group containing compound which may be aliphatic, aromatic or araliphatic;

(b) diphenylmethane diisocyanate having an NCO group content of about 33.6% and comprising:
  (i) from 0 to 60% by weight of 2,4'-diphenylmethane diisocyanate,
  (ii) less than 6% by weight of 2,2'-diphenylmethane diisocyanate, and
  (iii) the balance being 4,4'-diphenylmethane diisocyanate,
  wherein the %'s by weight of (b)(i), (b)(ii) and (b)(iii) total 100% by weight of (b), and
(d) an aromatic alcohol or an aliphatic alcohol.

The process of preparing these stable liquid biuret allophanate modified diphenylmethane diisocyanates comprises:
(1) reacting
  (a) a secondary monoamine group containing compound which may be aliphatic, aromatic or araliphatic;
  (b) diphenylmethane diisocyanate having an NCO group content of about 33.6% as described above and
  (c) an aromatic alcohol or an aliphatic alcohol,
  in the presence of
  (d) at least one allophanate catalyst.

Another aspect of the present invention includes the stable liquid prepolymers of biuret modified diphenylmethane diisocyanates having an NCO group content of about 6 to about 28% (preferably 15 to 26%) by weight, and the process of their preparation. These stable liquid prepolymers of biuret modified diphenylmethane diisocyanates comprise:
(A) the stable liquid biuret modified diphenylmethane diisocyanate as described above, and
(B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

The process for the preparation of these stable liquid prepolymers of biuret modified diphenylmethane diisocyanate having an NCO group content of about 6 to about 28% (preferably 15 to 26%) by wt. comprises:
(1) reacting:
  (A) the stable liquid biuret modified diphenylmethane diisocyanate having an NCO group content of 12 to 30% by wt. as described above,
  with
  (B) an isocyanate-reactive component selected from the group consisting of (1) one or more diols having a molecular weight of 76 to 200, (2) one or more polyether polyols having a molecular weight of 300 to 6000 and containing from about 1.5 to about 6 hydroxyl groups and (3) mixtures thereof,
  wherein the temperature is from about 40 to about 80° C., preferably from about 60 to about 65° C., for about 1 to 4 hours, preferably for about 2 hours.

The present invention is also directed to stable liquid prepolymers of biuret allophanate modified diphenylmethane diisocyanates having an NCO group content of 6 to 28% (preferably 15 to 26%) by wt., and to a process for their preparation. These stable liquid prepolymers of biuret allophanate modified diphenylmethane diisocyanate comprise:
  (C) the stable liquid biuret allophanate modified diphenylmethane diisocyanate as described above, and
  (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

The process for preparing these stable liquid prepolymers of the biuret allophanate modified diphenylmethane diisocyanates comprises:
(1) reacting:
  (C) the stable liquid biuret allophanate modified diphenylmethane diisocyanate as described above,
  with
  (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof,
  wherein the temperature is from about 40 to about 80° C., preferably from about 60 to about 65° C., for about 1 to 4 hours, preferably for about 2 hours.

DETAILED DESCRIPTION OF THE INVENTION

Suitable secondary monoamine group containing compounds include those aliphatic monoamine, aromatic monoamine and/or araliphatic monoamine group containing compounds which preferably have molecular weights of from about 45 to about 600. These compounds most preferably have molecular weights of from about 45 to about 250. More specifically, suitable secondary monoamines useful herein to form biurets in accordance with the present invention include those which correspond to the general formula:

wherein:
  R: represents a hydrocarbyl moiety selected from alkyl and cycloalkyl radicals, and
  $R^1$ represents a hydrocarbyl moiety selected from alkyl, cycloalkyl, arakyl, and aryl radicals,
  wherein R and $R^1$ may be the same or different moieties.

In general, suitable alkyl and cycloalkyl radicals contain from 1 to 18 carbon atoms, and preferably from 3 to 8 carbon atoms. The useful aralkyl and aryl radicals typically contain from 6 to 16 carbon atoms, and preferably from 6 to 10 carbon atoms. These hydrocarbyl moieties can also contain groups that do not react with isocyanates, e.g. ether groups and halogens such as chloride and bromide. The secondary monoamines used in the present invention should be free of any other group which is reactive with isocyanate groups. Some examples of suitable secondary monoamines for the present invention include, but are not limited to, dibutylamine, diisopropylamine, dioctylamine, butylethyl amine, N-ethylaniline, N-methyl-2-chloroaniline, and N-ethyl-o-toluidine. Preferred monoamines are the isomeric dipropyl-, dibutyl-, dipentyl-, dihexyl-, and dioctyl-amines.

Suitable diphenylmethane diisocyanates for the present invention include those having NCO group contents of about 33.6% by weight, and which comprise: (i) from 0 to 60%, preferably from 1.5 to 54%, and most preferably from about 1.8 to 30% by weight of 2,4'-diphenylmethane diisocyanate, (ii) less than 6%, preferably less than 2%, and most preferably less than 1% by weight of 2,2'-diphenylmethane diisocyanate, and (iii) the balance being 4,4'-diphenylmethane diisocyanate, wherein the %'s by weight of (i), (ii) and (iii) totals 100% by weight of the diphenylmethane diisocyanate component.

Suitable alcohols useful herein for forming biuret allophanate modified diphenylmethane diisocyanates include aliphatic alcohols and aromatic alcohols. Generally, suitable aliphatic alcohols preferably contain from 1 to 36 carbon atoms, and most preferably from about 4 to about 8 carbon atoms. Illustrative but nonlimiting examples of the suitable aliphatic alcohols can be selected from the group consisting of cycloaliphatic alcohols, aliphatic alcohols which may additionally contain groups that do not react with isocyanates, such as, for example, ether groups, halogens such chloride and bromine, etc. Some examples of specific alcohols suitable for this invention include isobutyl alcohol, cetylalcohol, cyclohexanol, 2-methoxyethanol and 2-bromoethanol. Suitable aromatic alcohols for this aspect of the present invention typically contain preferably from 5 to 20 carbon atoms and most preferably from 6 to 9 carbon atoms. Examples of suitable aromatic alcohols include compounds such as phenol, the cresols, the xylenols and the trimethylphenols.

In accordance with the present invention, suitable allophanate catalyts include zinc acetylacetonate, zinc 2-ethylhexanoate, cobalt 2-ethylhexyloate, cobalt naphthenate, lead linoresinate, etc. A preferred allophanate catalyst is zinc acetylacetonate.

When a catalyst stopper is desired or necessary, a compound which is an acidic material is typically used. Suitable examples of catalyst stoppers include anhydrous hydrochloric acid, sulfuric acid, bis(2-ethylhexyl) hydrogen phosphate, benzoyl chloride, Lewis acids, etc. In general, the amount of stopper added is such that there is at least 1 equivalent of acid for each mole of the allophanate catalyst.

In forming the prepolymers of the biuret modified diphenylmethane diisocyanates and the prepolymers of the biuret allophanate modified diphenylmethane diisocyanates, suitable isocyanate-reactive components include those selected from the group consisting of (1) one or more diols having a molecular weight of from about 76 to about 200, (2) one or more polyether polyols having a molecular weight of from about 300 to about 6000 and containing from about 1.5 to about 6 hydroxyl groups and (3) mixtures thereof. These yield urethane prepolymers having an NCO group content of from about 6 to about 28%, preferably from about 15 to about 26%.

Suitable diols to be used for the preparation of prepolymers include, for example, compounds such as 1,3-butanediol, 1,2- and/or 1,3-propylene glycol, 2,2,4-trimethyl-1,3-pentanediol, 2-methyl-1,3-propanediol, dipropylene glycol, tripropylene glycol, diethylene glycol, triethylene glycol, etc. Preferred diols include 1,3-butanediol, 1,2-propylene glycol, dipropylene glycol, tripropylene glycol, and mixtures thereof.

Suitable polyether polyols for the preparation of prepolymers include, for example, those having hydroxyl functionalities of from about 1.5 to about 6, preferably from about 1.8 to about 3, and molecular weights of from about 300 to about 6,000, preferably from about 400 to about 4,800. These polyether polyols are prepared by, for example polymerizing tetrahydrofuran or epoxides such as, for example, ethylene oxide, propylene oxide, butylene oxide, styrene oxide or epichlorohydrin in the present of suitable catalysts such as, for example, $BF_3$ or KOH or DMC (double metal cyanide), or by chemically adding these epoxides, in admixtures or sucessively, to components containing reactive hydrogen atoms such as water, alcohols or amines. Some examples of suitable starters for these polyether polyols include the low molecular weight chain extenders set forth hereinabove as diols as well as compounds such as propylene glycol, glycerin, ethylene glycol, triethanolamine, water, trimethylolpropane, bisphenol A, sucrose, aniline, ammonia, ethanolamine, ethylene diamine, etc.

As used herein, the term "liquid" means that the product (or material) does not precipitate solids when stored at 25° C. for 3 months. By the term "stable" as used herein, it is meant that the product has up to 1% absolute change in the NCO group content and up to 10% change in the viscosity when stored at 25° C. for 3 months.

The process of preparing the stable liquid biuret modified diphenylmethane diisocyanate comprises first reacting the diphenylmethane diisocyanate with a suitable secondary monoamine at temperatures of about 40 to about 90° C. to form the urea, which is subsequently converted to the biuret with the use of an allophanate catalysts at temperatures of about 50 to about 110° C. for a time of between about 1 and 8 hours (preferably about 1 and 5 hours). Lower temperatures in the catalysis step result in higher functionality of the resultant product (i.e. biuret modified MDI). Similarly, the process of preparing the stable liquid biuret-allophanate modified diphenylmethane diisocyanate comprises first reacting the diphenylmethane diisocyanate with a mixture of a suitable secondary monoamine and a suitable aromatic/aliphatic alcohol at temperatures of about 40 to about 90° C. to form the urea-urethane, which is subsequently converted to the biuret-allophanate with the use of an allophanate catalysts at temperatures of about 50 to about 110° C. for time periods of between about 1 and about 8 hours. Lower temperatures in the catalysis step result in higher functionality of the resultant product (i.e. biuret-allophanate modified MDI). After the biuret and/or the biuret-allophanate reaction is complete, an acidic stopper is added.

In an alternate process for preparing the biuret and/or the biuret-allophanate modified MDI, the reactants as described above (MDI and secondary monoamine for the biuret; and MDI, secondary monoamine and aromatic/aliphatic alcohol for the biuret-allophanate) are reacted in one step with the allophanate catalyst to form the biuret modified or the biuret-allophanate modified diphenylmethane diisocyanate. Once the conversion is complete, which requires from about 1 to about 8 hours (preferably from about 1 hour to about 5 hours) at temperatures of from about 50 to about 110° C., an acidic material which acts as a stopper for the allophanate catalyst is added. Lower temperatures in the catalysis step here will also result in higher functionality of the resultant product.

Stable liquid prepolymers of the biuret modified diphenylmethane diisocyanate and stable liquid prepolymers of the biuret-allophanate modified diphenylmethane diisocyanates are prepared, respectively, from the biuret modified MDI and the biuret-allophanate modified MDI described (and prepared) above (including the addition of an acidic material as a catalyst stopper), by reacting the biuret modified MDI or the biuret-allophanate modified MDI with a suitable polyether polyol or a suitable diol at temperatures ranging from about 40 to about 80° C. (preferably from about 60 to about 65° C.) for about 1 to about 4 hours (preferably for about 2 hours).

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

As used herein, the molecular weights referred to are number average molecular weights ($M_n$) and are determined by end group analysis (OH number). By the term "Isocyanate Index" (also commonly referred to as NCO index), is defined herein as the equivalents of isocyanate, divided by the total equivalents of isocyanate-reactive hydrogen containing materials, multiplied by 100.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the working examples for the preparation of the biuret and biuret-allophanate modified MDI.

MDI-X: Diphenylmethane diisocyanate, which contains less than 6% by weight 2,2'-isomer of diphenylamethane diisocyanate and in which X represents the percent by weight 2,4'-isomer of MDI with the remainder being the 4,4'- and 2,2'-isomers.

IBA: Isobutyl Alcohol
DBA: Di-butylamine
NEA: N-Ethylaniline
Catalyst A: Zinc Acetylacetonate

Example 1

100 parts of MDI-2 were charged to a stirred reactor equipped with a nitrogen purge. To the stirred MDI-2 at 60° C. was added 0.015 part Catalyst A and 9.5 parts DBA. The stirred reaction mixture was then held at 100° C. for 2 hours followed by addition of 0.03 part benzoyl chloride. The reaction mixture was then cooled to 25° C. The clear yellow biuret modified MDI-2 had an NCO content of 23.8% and a viscosity at 25° C. of 363 mPa·s.

Example 2

Using the same procedure and same amount of components as were used in Example 1, the mixture was heated at 90° C. for 2 hours to give a biuret modified MDI-2 having an NCO content of 22.9% and a viscosity at 25° C. of 964 mPa·s.

Example 3

The procedure of Example 1 was repeated using the same quantities of components, except the mixture was heated at 80° C. for 2 hours to give a biuret modified MDI-2 having an NCO content of 22.6% and a viscosity at 25° C. of 1622 mPa·s.

Example 4

The procedure of Example 1 was repeated using the same quantities of components, except the mixture was heated at 70° C. for 2 hours to give a biuret modified MDI-2 having an NCO content of 22.7% and a viscosity at 25° C. of 1876 mPa·s.

Example 5

The procedure of Example 1 was repeated using the same quantities of components, except the mixture was, heated at 60° C. for 5 hours to give a biuret modified MDI-2 having an NCO content of 22.2% and a viscosity at 25° C. of 3155 mPa·s.

Example 6

The procedure described in Example 1 was repeated except MDI-52 was used instead of MDI-2. The reaction mixture was heated at 90° C. for 3 hours to give a biuret modified MDI-52 having an NCO content of 23.3% and a viscosity at 25° C. of 549 mPa·s.

Example 7

100 parts of MDI-2, 8.4 parts of DBA, and 0.7 part of IBA were added to a stirred reactor having a nitrogen purge. 0.015 part Catalyst A was added and the mixture was heated at 90° C. for 1.5 hours followed by the addition of 0.03 part benzoyl chloride. The reaction mixture was cooled to 25° C. to give a clear yellow biuret-allophanate modified MDI-2 having an NCO content of 23.7% and a viscosity at 25° C. of 458 mPa·s.

Example 8

The procedure of Example 7 was repeated using 100 parts MDI-2, 7.4 parts DBA and 1.2 parts IBA to give a clear yellow biuret-allophanate modified MDI-2 having an NCO content of 24.0% and a viscosity at 25° C. of 305 mPa·s.

Example 9

100 parts of MDI-2 and 9 parts NEA were added to a stirred reactor having a nitrogen purge. 0.015 part Catalyst A was added and the mixture was heated at 100° C. for 2 hours followed by the addition of 0.03 part benzoyl chloride. The reaction mixture was cooled to 25° C. to give a clear yellow biuret modified MDI-2 having an NCO content of 24.7% and a viscosity at 25° C. of 214 mPa·s.

Example 10

The procedure of Example 9 was repeated using the same quantities of the same components, except the mixture was heated at 90° C. for 2 hours to give a biuret modified MDI-2 having an NCO content of 24.4% and a viscosity at 25° C. of 330 mPa·s.

Example 11

The procedure of Example 9 was repeated using the same quantities of the same components, except the mixture was heated at 80° C. for 2 hours to give a biuret modified MDI-2 having an NCO content of 23.9% and a viscosity at 25° C. of 487 mPa·s.

Example 12

The procedure of Example 9 was repeated using the same quantities of the same components, except the mixture was heated at 70° C. for 2 hours to give a biuret modified MDI-2 having an NCO content of 23.7% and a viscosity at 25° C. of 2107 mPa·s.

Example 13

100 parts of MDI-2, 9.7 parts of NEA, and 1.4 parts of IBA were added to a stirred reactor having a nitrogen purge.

0.015 part Catalyst A was added and the mixture was heated at 90° C. for 1.5 hours followed by the addition of 0.03 part benzoyl chloride. The reaction mixture was cooled to 25° C. to give a clear yellow biuret-allophanate modified MDI-2 having an NCO content of 25.2% and a viscosity at 25° C. of 207 mPa·s.

Example 14

The procedure of Example 13 was repeated using 100 part MDI-2, 7 parts NEA, and 2.8 parts IBA to give a clear yellow biuret-allophanate modified MDI-2 having an NCO content of 25.2% and a viscosity at 25° C. of 134 mPa·s.

Example 15

The procedure of Example 13 was repeated using 100 parts MDI-2, 4.25 parts NEA, and 4.25 parts IBA to give a clear yellow biuret-allophanate modified MDI-2 having an NCO content of 26.6% and a viscosity at 25° C. of 79 mPa·s. The following materials were used in the working examples for the preparation of the biuret prepolymers.

Iso A: Biuret modified MDI-2 of Example 2.
Iso B: Biuret modified MDI-2 of Example 11.
Polyether A: A propylene glycol/propylene oxide adduct having a molecular weight of 1000 and a functionality of about 2.
Polyether B: A propylene glycol/propylene oxide adduct having a molecular weight of 2000 and a functionality of about 2.
Polyether C: A propylene glycol/propylene oxide/ethylene oxide adduct terminated with 20% by wt. of ethylene oxide and having a molecular weight of 4000 and a functionality of about 2.
Polyether D: A glycerine/propylene oxide/ethylene oxide adduct terminated with 17% by weight ethylene oxide having a molecular weight of 4800 and a functionality of about 3.

Example 16

59.8 parts Iso A were charged to a stirred reactor and 40.2 parts of Polyether B were added. The reaction mixture was held at 60° C. for 2 hours and then cooled to 25° C. The clear liquid prepolymer had an NCO content of 12.0% and a viscosity at 25° C. of 12,500 mPa·s.

Examples 17 through 24

Examples 17 through 24 used the process of Example 16 as described above. The materials used and the percent NCO and viscosity obtained are set forth in the following table for Examples 16 through 24.

TABLE 1

| Example | Iso | PBW Iso | Polyether | PBW Polyether | % NCO | Visc. @ 25° C., mPa · s (cps) |
|---|---|---|---|---|---|---|
| 16 | A | 59.8 | B | 40.2 | 12.0 | 12,500 |
| 17 | A | 56.4 | C | 43.6 | 11.9 | 6177 |
| 18 | A | 80.4 | C | 19.6 | 17.9 | 2651 |
| 19 | A | 65.2 | A | 34.8 | 12.2 | 42,138 |
| 20 | A | 57.3 | D | 42.7 | 12.2 | 9715 |
| 21 | B | 79 | B | 21 | 18.2 | 2149 |
| 22 | B | 54.2 | C | 45.8 | 12.2 | 4335 |
| 23 | B | 81.7 | A | 18.3 | 18.1 | 3450 |
| 24 | B | 55.1 | D | 44.9 | 12.1 | 5783 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable liquid biuret modified diphenylmethane diisocyanate comprising a secondary amine based biuret modified diphenylmethane diisocyanate having an NCO group content of 12 to 30% by weight, comprising:
    (a) a secondary monoamine group containing compound which may be aliphatic, aromatic or araliphatic; and
    (b) diphenylmethane diisocyanate having an NCO group content of about 33.6% and comprising:
        (i) from 0 to 60% by weight of 2,4'-diphenylmethane diisocyanate,
        (ii) less than 6% by weight of 2,2'-diphenylmethane diisocyanate, and
        (iii) the balance being 4,4'-diphenylmethane diisocyanate,
    wherein the %'s by weight of (b)(i), (b)(ii) and (b)(iii) total 100% by weight of (b).

2. The stable liquid biuret modified diphenylmethane diisocyanate of claim 1, wherein the NCO group content is from about 16 to about 28% by weight.

3. The stable liquid biuret modified diphenylmethane diisocyanate of claim 1, wherein (a) said secondary monoamine group containing compounds have a molecular weight of from about 45 to about 600.

4. The stable liquid biuret modified diphenylmethane diisocyanate of claim 1, wherein (a) said secondary monoamine group containing compounds are selected from the group consisting of dipropylamine, dibutylamine, dipentylamine, dihexylamine and dioctylamine.

5. The stable liquid biuret modified diphenylmethane diisocyanate of claim 1, wherein (b) said diphenylmethane diisocyanate comprises:
    (i) from about 1.5 to about 54% by weight of 2,4'-diphenylmethane diisocyanate,
    (ii) less than 2% by weight of 2,2'-diphenylmethane diisocyanate, and
    (iii) the balance being 4,4'-diphenylmethane diisocyanate,
    wherein the %'s by weight of (b)(i), (b)(ii) and (b)(iii) total 100% by weight of (b).

6. A process for the preparation of a stable liquid biuret modified diphenylmethane diisocyanate comprising a secondary amine based biuret modified diphenylmethane diisocyanate having an NCO group content of 12 to 30% by weight, comprising
    (1) reacting
        (a) a secondary monoamine group containing compound which may be aliphatic, aromatic or araliphatic;
    with
        (b) diphenylmethane diisocyanate having an NCO group content of about 33.6% and comprising:
            (i) from 0 to 60% by weight of 2,4'-diphenylmethane diisocyanate,
            (ii) less than 6% by weight of 2,2'-diphenylmethane diisocyanate, and
            (iii) the balance being 4,4'-diphenylmethane diisocyanate,
        wherein the %'s by weight of (b)(i), (b)(ii) and (b)(iii) total 100% by weight of (b);
    in the presence of
        (c) at least one allophanate catalyst.

7. The process of claim 6, wherein said stable liquid diphenylmethane diisocyanate has an NCO group content of from about 16 to about 28% by weight.

8. The process of claim 6, wherein (a) said secondary monoamine group containing compounds have a molecular weight of about 45 to about 600.

9. The process of claim 6, wherein (a) said secondary monoamine group containing compounds are selected from the group consisting of dipropylamine, dibutylamine, dipentylamine, dihexylamine and dioctylamine.

10. The process of claim 6, wherein (b) said diphenylmethane diisocyanate comprises:
 (i) from about 1.5 to about 54% by weight of 2,4'-diphenylmethane diisocyanate,
 (ii) less than 2% by weight of 2,2'-diphenylmethane diisocyanate, and
 (iii) the balance being 4,4'-diphenylmethane diisocyanate, wherein the %'s by weight of (b)(i), (b)(ii) and (b)(iii) total 100% by weight of (b).

11. A stable liquid biuret allophanate modified diphenylmethane diisocyanate having an NCO group content of 12 to 30% by weight, and comprising
 (a) a secondary monoamine group containing compound which may be aliphatic, aromatic or araliphatic;
 (b) diphenylmethane diisocyanate having an NCO group content of about 33.6% and comprising:
  (i) from 0 to 60% by weight of 2,4'-diphenylmethane diisocyanate,
  (ii) less than 6% by weight of 2,2'-diphenylmethane diisocyanate, and
  (iii) the balance being 4,4'-diphenylmethane diisocyanate,
 wherein the %'s by weight of (b)(i), (b)(ii) and (b)(iii) total 100% by weight of (b);
 and
 (c) an aliphatic or aromatic alcohol.

12. The stable liquid biuret allophahate modified diphenylmethane diisocyanate of claim 11, wherein the NCO group content is from about 16 to about 28% by weight.

13. The stable liquid biuret allophanate modified diphenylmethane diisocyanate of claim 11, wherein (a) said secondary monaomine group containing compounds have a molecular weight of from about 45 to about 600.

14. The stable liquid biuret allophanate modified diphenylmethane diisocyanate of claim 11, wherein (b) said diphenylmethane diisocyanate comprises:
 (i) from about 1.5 to about 54% by weight of 2,4'-diphenylmethane diisocyanate,
 (ii) less than 2% by weight of 2,2'-diphenylmethane diisocyanate, and
 (iii) the balance being 4,4'-diphenylmethane diisocyanate, wherein the %'s by weight of (b)(i), (b)(ii) and (b)(iii) totals 100% by weight of (b).

15. The stable liquid biuret allophanate modified diphenylmethane diisocyanate of claim 11, wherein (c) said aliphatic alcohol has from 1 to 36 carbon atoms and said aromatic alcohol has from 5 to 20 carbon atoms.

16. A process for the preparation of a stable liquid biuret allophanate modified diphenylmethane diisocyanate having an NCO group content of 12 to 30% by weight, comprising:
 (1) reacting
  (a) a secondary monoamine group containing compound which may be aliphatic, aromatic or araliphatic;
  (b) diphenylmethane diisocyanate having an NCO group content of about 33.6% and comprising:
   (i) from 0 to 60% by weight of 2,4'-diphenylmethane diisocyanate,
   (ii) less than 6% by weight of 2,2'-diphenylmethane diisocyanate, and
   (iii) the balance being 4,4'-diphenylmethane diisocyanate, wherein the %'s by weight of (b)(i), (b)(ii) and (b)(iii) total 100% by weight of (b);
 and
 (c) an aliphatic alcohol or an aromatic alcohol;
 in the presence of:
 (d) at least one allophanate catalyst.

17. The process of claim 16, wherein the NCO group content is from about 16 to about 28% by weight.

18. The process of claim 16, wherein (a) said secondary monaomine group containing compounds have a molecular weight of from about 45 to about 600.

19. The process of claim 16, wherein (b) said diphenylmethane diisocyanate comprises:
 (i) from about 1.5 to about 54% by weight of 2,4'-diphenylmethane diisocyanate,
 (ii) less than 2% by weight of 2,2'-diphenylmethane diisocyanate,
 and
 (iii) the balance being 4,4'-diphenylmethane diisocyanate, wherein the %'s by weight of (b)(i), (b)(ii) and (b)(iii) totals 100% by weight of (b).

20. The process of claim 16, wherein (c) said aliphatic alcohol has from 1 to 36 carbon atoms and said aromatic alcohol has from 5 to 20 carbon atoms.

21. A stable liquid prepolymer of biuret modified diphenymethane diisocyanate having an NCO group content of about 6 to about 28% by weight, comprising
 (A) the stable liquid biuret modified diphenylmethane diisocyanate of claim 1;
 and
 (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

22. The stable liquid prepolymer of claim 21, wherein the NCO group content is from about 15 to 26% by weight.

23. The stable liquid prepolymer of claim 21, wherein (B)(1) said diols are selected from the group consisting of 1,3-butanediol, 1,2-propylene glycol, dipropylene glycol, tripropylene glycol and mixtures thereof, and (B)(2) said polyether polyols having molecular weights of from about 400 to about 4,800 and functionalities of from about 1.8 to about 3.

24. A process for the preparation of a stable liquid prepolymer of biuret modified diphenylmethane diisocyanate having an NCO group content of about 6 to 28% by weight, comprising:
 (1) reacting:
  (A) the stable liquid biuret modified diphenylmethane diisocyanate of claim 1,
  with
  (B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof;

at a temperature is from about 40 to 80° C. for about 1 to 4 hours.

25. The process of claim 24, wherein the temperature is from about 60 to about 65° C. for about 2 hours.

26. The process of claim 24, wherein the stable liquid prepolymer of biuret modified diphenyl diisocyanate has an NCO group content of from about 15 to about 26% by weight.

27. The process of claim 24, wherein (B)(1) said diols are selected from the group consisting of 1,3-butanediol, 1,2-propylene glycol, dipropylene glycol, tripropylene glycol and mixtures thereof, and (B)(2) said polyether polyols having molecular weights of from about 400 to about 4,800 and functionalities of from about 1.8 to about 3.

28. A stable liquid prepolymer of biuret allophanate modified diphenylmethane diisocyanate having an NCO group content of 6 to 28% and comprising:
(C) the stable liquid biuret allophanate modified diphenylmethane diisocyanate of claim 11;
and
(B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof.

29. The stable liquid prepolymer of claim 28, wherein the NCO group content is from about 15 to 26% by weight.

30. The stable liquid prepolymer of claim 28, wherein (B)(1) said diols are selected from the group consisting of 1,3-butanediol, 1,2-propylene glycol, dipropylene glycol, tripropylene glycol and mixtures thereof, and (B)(2) said polyether polyols having molecular weights of from about 400 to about 4,800 and functionalities of from about 1.8 to about 3.

31. A process for the preparation of a stable liquid prepolymer of biuret allophanate modified diphenylmethane diisocyanate having an NCO group content of 6 to 28% by weight, comprising:
(1) reacting:
(C) the stable liquid biuret allophanate modified diphenylmethane diisocyanate of claim 11,
with
(B) an isocyanate-reactive component selected from the group consisting of (1) one or more diols having a molecular weight of 76 to 200, (2) one or more polyether polyols having a molecular weight of from 300 to 6000 and containing from about 1.5 to about 6 hydroxyl groups and (3) mixtures thereof;
wherein the temperature ranges from about 40 to 80° C. for about 1 to 4 hours.

32. The process of claim 31, wherein the temperature ranges from about 60 to about 65° C. for about 2 hours.

33. The process of claim 31, wherein the stable liquid prepolymer of biuret allophanate modified diphenylmethane diisocyanate has an NCO group content of from about 15 to about 26% by weight.

34. The process of claim 31, wherein (B)(1) said diols are selected from the group consisting of 1,3-butanediol, 1,2-propylene glycol, dipropylene glycol, tripropylene glycol and mixtures thereof, and (B)(2) said polyether polyols having molecular weights of from about 400 to about 4,800 and functionalities of from about 1.8 to about 3.

* * * * *